United States Patent
De Gersem et al.

(10) Patent No.: US 9,730,392 B2
(45) Date of Patent: Aug. 15, 2017

(54) AGRICULTURAL BALER KNOTTER SYSTEM

(71) Applicant: CNH Industrial America LLC, New Holland, PA (US)

(72) Inventors: Tom De Gersem, Bruges (BE); Kenny Maelfeyt, Vlissegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/205,993

(22) Filed: Jul. 8, 2016

(65) Prior Publication Data
US 2017/0006780 A1 Jan. 12, 2017

(30) Foreign Application Priority Data
Jul. 8, 2015 (BE) .................................. 2015/0181

(51) Int. Cl.
*A01F 15/08* (2006.01)
*A01F 15/14* (2006.01)

(52) U.S. Cl.
CPC ........ *A01F 15/148* (2013.01); *A01F 15/0875* (2013.01); *A01F 15/145* (2013.01); *A01F 2015/143* (2013.01)

(58) Field of Classification Search
CPC ........ A01F 15/04; A01F 15/042; A01F 15/14; A01F 15/145; A01F 15/148; A01F 15/0875; A01F 2015/143
USPC .......... 100/8, 18, 19 R, 20, 21, 23, 24, 33 R
See application file for complete search history.

(56) References Cited

U.S. PATENT DOCUMENTS

| 3,366,036 A | * | 1/1968 | May .................... A01F 15/0858 100/4 |
| 4,196,661 A |  | 4/1980 | Yatcilla et al. |
| 4,420,177 A | * | 12/1983 | Munro ................. A01F 15/145 289/14 |
| 4,735,446 A | * | 4/1988 | Homberg ............. A01F 15/145 289/10 |

(Continued)

FOREIGN PATENT DOCUMENTS

| BE | EP 1066747 A1 * | 1/2001 | ............. A01F 15/04 |
| BE | EP 2011385 A1 * | 1/2009 | ............. A01F 15/14 |

(Continued)

OTHER PUBLICATIONS

EP16177533, Extended European Search Report, mailed Nov. 23, 2016, 5 pages.

*Primary Examiner* — Jimmy T Nguyen
(74) *Attorney, Agent, or Firm* — Peter K. Zacharias; Patrick M. Sheldrake

(57) ABSTRACT

An agricultural baler includes a main bale chamber, needles, knotters, a triggering system, a knotter lock, a blow-off mechanism, and a monitoring system. The needles are coupled to the main bale chamber and thread twine around a formed bale. The knotters receive the twine from the needles and tie the twine. The triggering system is for activating the needles and the knotters. The knotter lock is a manual lock of the triggering system thereby preventing the needles and the knotters from being triggered. The blow-off mechanism directs a flow of air at the knotters and the needles. The monitoring system has a single sensor that provides signals indicating a normal operation of the knotters, and whether the knotter lock is engaged.

12 Claims, 5 Drawing Sheets

(56) References Cited

U.S. PATENT DOCUMENTS

| | | |
|---|---|---|
| 4,765,235 A | 8/1988 | Schrag et al. |
| 4,885,991 A | 12/1989 | Borba |
| 5,058,495 A | 10/1991 | Van den Bossche et al. |
| 6,474,228 B1 | 11/2002 | Leupe et al. |
| 7,900,555 B2 | 3/2011 | Webber |
| 8,671,834 B1 | 3/2014 | Rotole et al. |
| 8,924,091 B2 | 12/2014 | Seeger |
| 2007/0175611 A1 | 8/2007 | Roth et al. |
| 2014/0367965 A1 | 12/2014 | Vergote |

FOREIGN PATENT DOCUMENTS

| | | |
|---|---|---|
| DE | 4031695 A1 | 4/1992 |
| EP | 477479 A1 | 4/1992 |
| EP | 1813788 A1 | 8/2007 |
| EP | 2803259 A1 | 11/2014 |
| WO | 2013107718 A1 | 7/2013 |

\* cited by examiner

AGRICULTURAL BALER KNOTTER SYSTEM

CROSS REFERENCE TO RELATED APPLICATION

This application claims priority to Belgium Application No. 2015/0181, filed Jul. 8, 2015, the contents of which are incorporated herein by reference.

FIELD OF THE INVENTION

The present invention relates to agricultural balers, and, more particularly, to agricultural square balers having a monitoring system for the knotting/triggering systems.

BACKGROUND OF THE INVENTION

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters and needles are actuated which wrap and tie twine, cord or the like around the bale while it is still in the main bale chamber. The twine is carried to the knotters by the needles that pivot through the bale chamber to the knotters. The twine is grasped, cut and tied, and the formed baled is ejected out the back of the baler as a new bale is formed.

In EP1066747 a baler is disclosed having a sensor and timer operations, including a trip arm related to a stuffer mechanism that activates the sensor. However, the sensor is not for a knotter mechanism.

In EP2011385 it is disclosed that a blast of air can be delivered at the tip of the needles to dislodge crop material as they arrive at the knotters having passed through the bale chamber.

In U.S. Pat. No. 465,235 there is disclosed a monitoring system for detecting the malfunctioning of a knotting mechanism of a baler. However the system does not monitor or control multiple features.

In EP2803259 a tractor and baler combination is shown where a control unit is able to control the drive connection between the tractor and baler when a critical operating state of the pickup or knotting mechanism of the baler is detected.

What is needed in the art is an agricultural baler that can effectively monitor multiple functions of the knotting system in an efficient manner.

SUMMARY OF THE INVENTION

In accordance with an aspect of the present invention, there is provided an agricultural baler with an efficient usage of a single sensor relative to knotter functioning.

In accordance with another aspect of the present invention, there is provided an agricultural baler including a main bale chamber, needles, knotters, a triggering system, a knotter lock, a blow-off mechanism, and a monitoring system. The needles are coupled to the main bale chamber, and thread twine around a formed bale. The knotters receive the twine from the needles and tie the twine. The triggering system activates the needles and the knotters. The knotter lock is a manual lock of the triggering system thereby preventing the needles and the knotters from being triggered. The blow-off mechanism directs a flow of air at the knotters and/or the needles when moved to the knotters. The monitoring system has a single sensor that provides signals indicating a normal operation of the knotters, an engagement of the knotter lock, and a time to trigger the blow-off mechanism for a predetermined amount of time.

An advantage of the agricultural baler is that it is able to monitor several functions using one sensor.

Another advantage is that the engagement of the knotter lock is detected to help prevent operation of the baler when the knotter lock is engaged. Then, a knotter locked operation message can be send to a display, warning the operator of a traction unit (e.g. a tractor) that the knotter lock is engaged. Alternatively or additionally, a sound can be heard or a light can be flashed in the operators cab to warn the operator. When the knotter lock is disengaged, normal working of the knotters and needles is possible, and operation of the baler and traction unit can now continue.

Yet another advantage is that the agricultural baler times the blowing off of the knotters and the needles at the appropriate time.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
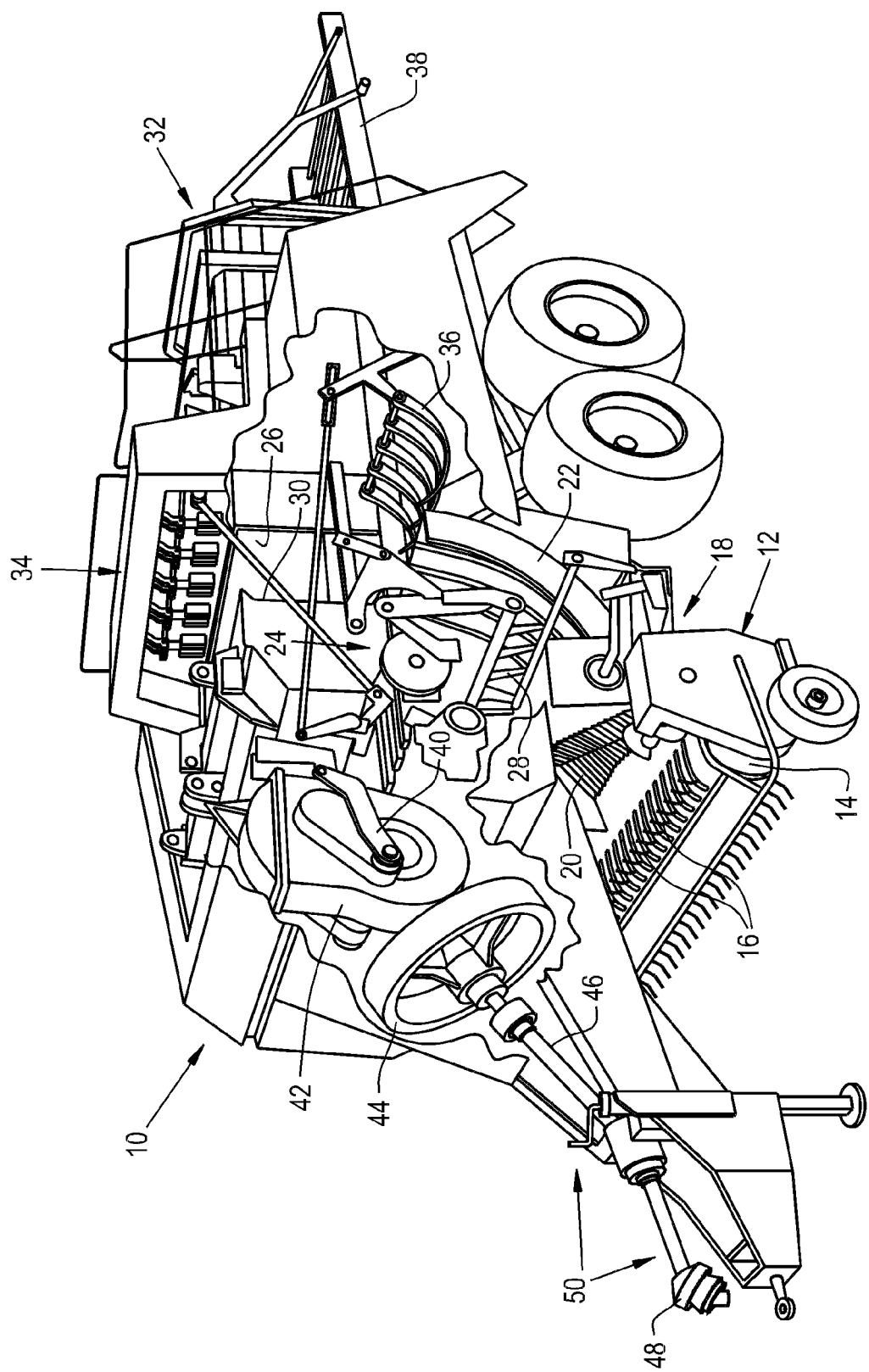
FIG. 1 is a perspective cutaway view showing internal workings of a large square baler comprising a monitoring system, in accordance with an exemplary embodiment of the present invention.

Referring now to the drawings, and more particularly to FIG. 1, there is shown a perspective cutaway view showing the internal workings of a large square baler 10, in accordance with an exemplary embodiment of the present invention. The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process takes place. The twine is cut and the formed bale is ejected from a discharge chute 38 as a new bale is formed.

The plunger 30 is connected via a crank arm 40 with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46, and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown).

Now, additionally referring to FIGS. 2-5, there are shown side views of a triggering system 52 and a monitoring system 58 (shown schematically in FIG. 5) associated therewith and located on the agricultural baler 10, in accordance with an exemplary embodiment of the present invention. The triggering system 52 is generally located on a top of the main bale chamber 26 along with a knotter lock 54 and a blow-off mechanism 56 (shown schematically in FIG. 5). The monitoring system 58 interacts with elements of the triggering system 52 and part of the monitoring system 58 may be located in a traction unit, such as a tractor (not shown) that is pulling and providing power to the agricultural baler 10.

Figure 3:
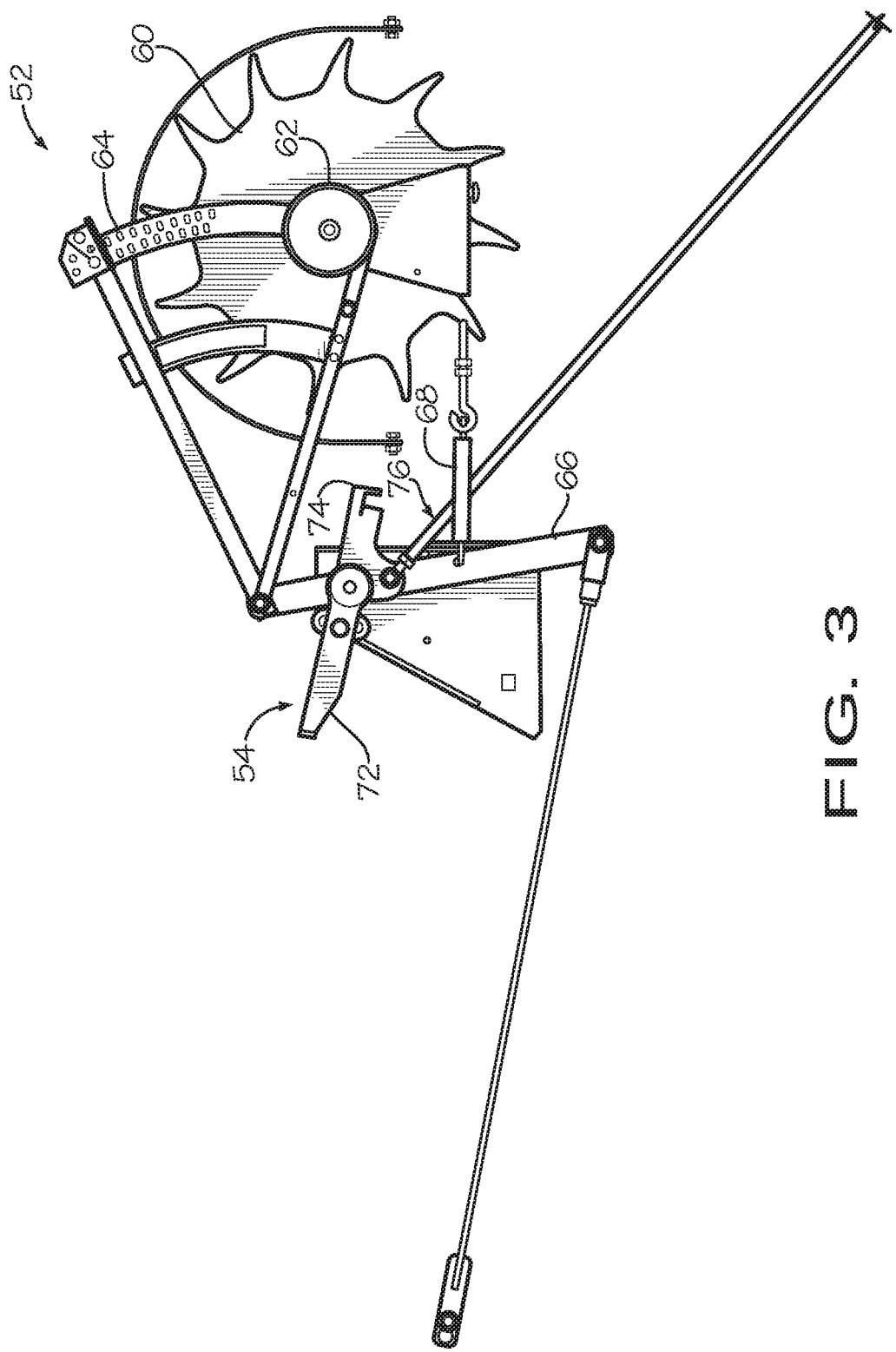
FIG. 3 is another side view of the triggering system of FIG. 2, when a bale knotting operation is being triggered, in accordance with an exemplary embodiment of the present invention.
Figure 4:
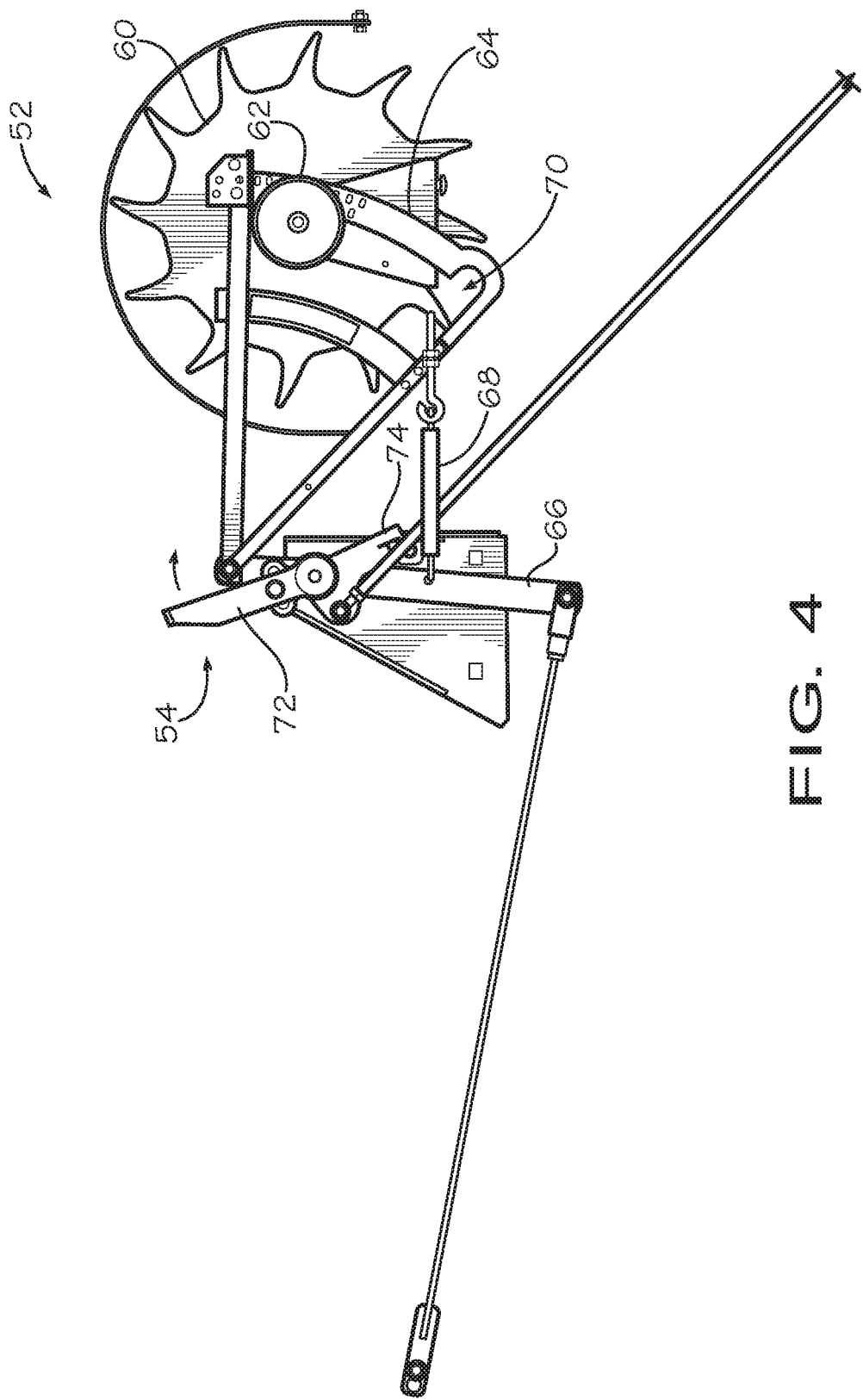
FIG. 4 is yet another side view of the triggering system of FIGS. 2 and 3 with a knotter lock engaged, in accordance with an exemplary embodiment of the present invention.
Figure 5:
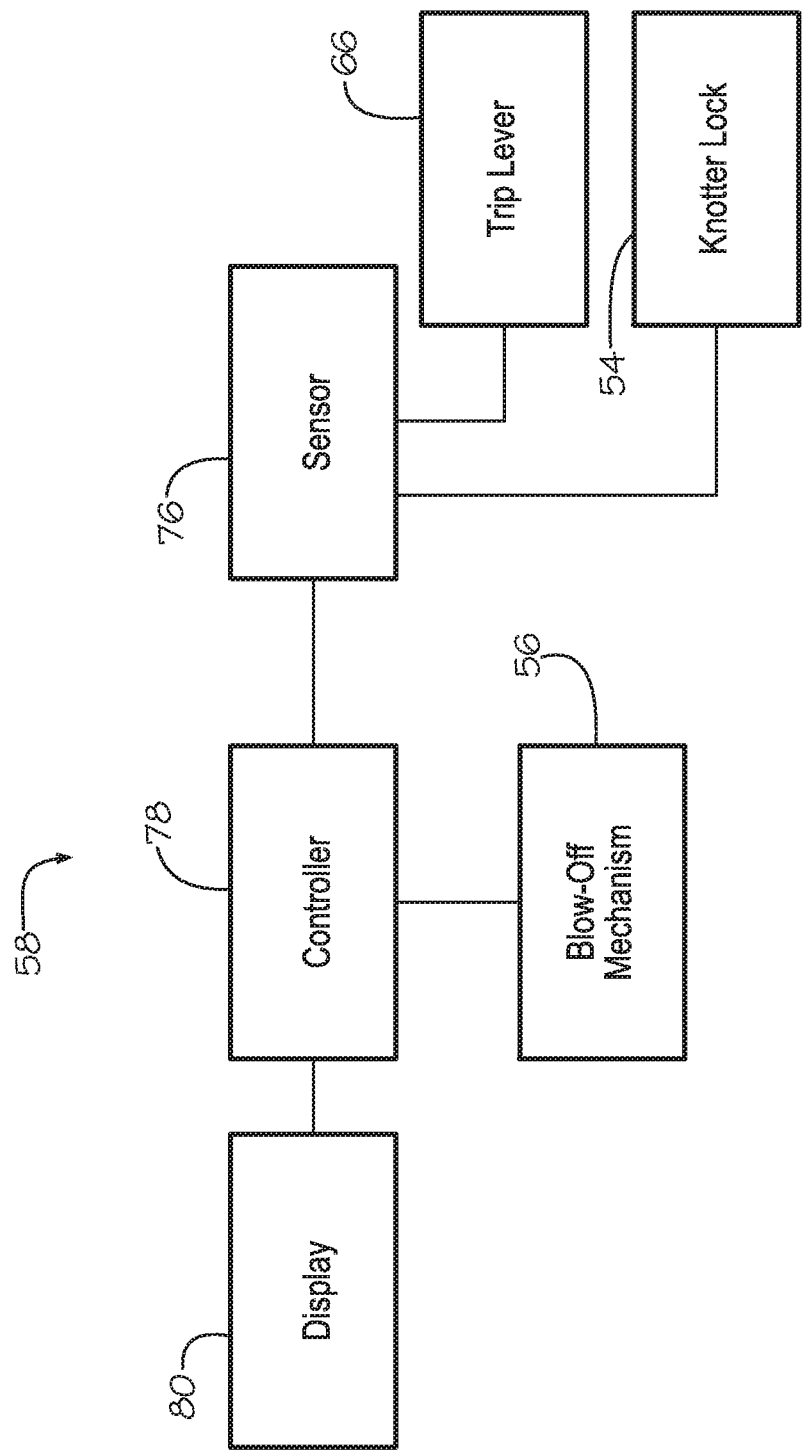
FIG. 5 is a block diagram illustrating connections and functions of the monitoring system using the sensor with the triggering system of FIGS. 2-4 in the baler of FIG. 1, in accordance with an exemplary embodiment of the present invention.

The triggering system 52 includes a star wheel 60, a coupling wheel 62, a pivoting gauge 64, a trip lever 66, and a spring 68. The star wheel 60 engages the crop material along a top side of the bale as the bale is moved in the main bale chamber 26. The star wheel 60 moves proportionally with the length of the bales causing the coupling wheel 62 to move the pivoting gauge 64 in an upward direction. When the pivoting gauge 64 is raised to a release point 70 (as seen in FIG. 3), the tension on the spring 68 causes the bottom portion of the trip lever 66 to be pulled to the right and the triggering event occurs for the bale tying sequence to begin. This is precluded from happening if the knotter lock 54 is engaged (as shown in FIG. 4), where a handle 72 is moved in a clockwise direction causing a locking portion 74 to engage part of the triggering system 52. The knotter lock 54 is engaged for purposes of safety when maintenance is being done to the baler 10 to preclude the triggering of the operation of the needles 36 and the knotters 34. If the knotter lock 54 is left engaged and the agricultural baler 10 is operated then no knotting operation takes place and the operator may have compressed a significant amount of crop material and wasted twine and time, and a need to then re-bale the crop material.

The monitoring system 58 includes a sensor 76, a controller 78, and a display 80. The display 80 may be part of the traction unit and in an operator cab of the traction unit for conveying information to the operator. The controller 78 may be a standalone unit or its functions may be carried by another controller on the agricultural baler, or by way of dedicated circuits. The controller 78 executes software instructions to perform the functionality of the controller 78 described herein. Such software instructions are stored on a computer-readable tangible medium, either internal to the controller 78 or external thereto. The controller 78 loads such software instructions and executes them to perform the functionality described herein. The sensor 76 is a single sensor that carries out several functions because of its positioning and the data available to it as a result of its desirable positioning. The sensor 76 may be a proximity sensor, an optical sensor, a contact sensor, a magnetic sensor, or other type of sensor that can serve the purposes discussed herein. The sensor 76 provides a signal or signals to the controller 78 based on a sensed parameter or parameters. The controller 78 interprets the signal or signals received from the sensor 76.

Figure 2:
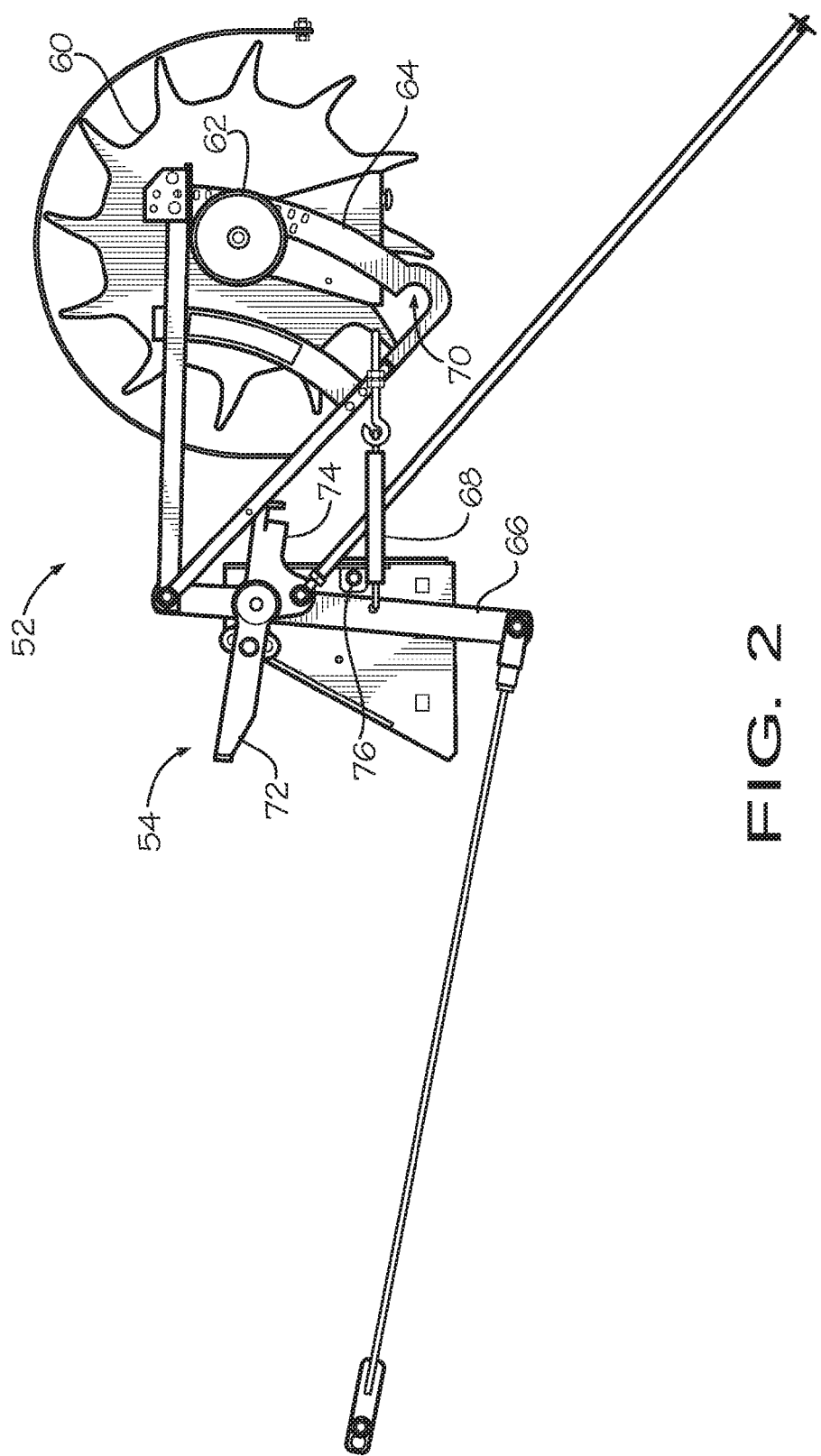
FIG. 2 is a side partial view of the baler of FIG. 1 illustrating an embodiment of a sensor used in cooperation with a triggering system, in accordance with an exemplary embodiment of the present invention.

In FIG. 2, the knotter lock 54 is in an unengaged position with locking portion 74 apart from the sensor 76, and the trip lever 66 is also apart from the sensor 76. This results in either a non-signal provided from the sensor 76 to the controller 78 or a signal indicating that there is nothing detected proximate to the sensor 76, so that the controller 78 would interpret this signal as the knotter lock 54 being disengaged and no warning would be sent to the display 80 by the controller 78. When the star wheel 60 is advanced and the pivoting gauge 64 is advanced, as shown in FIG. 3, this causes the trip lever 66 to move proximate to the sensor 76 and the proximity of the trip lever 66 is detected and a signal is generated by the sensor 76 and transmitted to the controller 78. Meanwhile the needles 36 move through the main bale chamber 26 and the twine is conveyed to the knotters 34 and the bale is tied. As this is happening the triggering system is reset with the trip lever 66 being pulled back allowing the pivoting gauge 64 to pivot downwardly until the top of the pivoting gauge 64 settles against the coupling wheel 62. This movement of course causes the trip lever 66 to move away from the sensor 76, back to a position as shown in FIG. 2. Since the trip lever 66 is no longer proximate to the sensor 76, the signal generated by the sensor 76 and provided to the controller 78 indicates to the controller 78 that a momentary presence, of less than one second to a few seconds in duration, has occurred and that the detection is of a normal operation of the baler 10 and more specifically of the knotter system composed of the knotters 34, the needles 36, and the triggering system 52.

When the signal sent by the sensor 76 is representative of the movement/presence of the trip lever 66, not only is a signal indicating a normal operation of the baler 10 sent to the display 80 by the controller 78, but also a count that another bale has been completed can be sent. Yet further, when the triggering event occurs the controller 78 sends a signal to the blow-off mechanism 56 to cause air to flow on the knotters 34 and/or a distal end of the needles 36 as they become proximate to the knotters 34 having traveled through the main bale chamber 26, and they may have become fouled with some crop matter, which needs to be removed. This airflow or blast of air helps to ensure a cleaning action and a resulting reliable handoff of the twine to the knotters 34 so that they can tie the knots and cut the twine of the completed bale.

When the knotter lock 54 is in the locked position, as shown in FIG. 4, the sensor 76 provides a constant signal indicating the proximity of the knotter lock 54 to the controller 78. The constant signal is interpreted by the controller 78 as the knotter lock 54 remaining in an engaged position and hence information to that effect is sent to the display 80 by the controller 78. It is also contemplated that an alarm signal may be initiated by the controller 78 in the event that movement of the traction vehicle takes place while the indication of the engagement of the knotter lock 54 continues. The controller 78 may transmit the alarm signal to the display 80 for display thereon, or it may alternatively transmit the alarm signal to a speaker (as a sound alarm), to a lamp (as a (flashing) light alarm), or a combination of them in the operator cab to warn the operator that the knotter lock 54 is still in the engaged position and that forward driving of the traction vehicle should be stopped.

The triggering system 52, specifically the controller 78, detects the normal operation of the knotter 34 mechanism, and transmits a warning signal in case the knotter lock 54 is activated. (Without this advantage there is nothing on the machine to warn the operator if the lock 54 is still activated after servicing the knotters 34. This is disadvantageous since a very long bale will be produced until the operator notices that the knotters 34 are not functioning.) Further, the triggering system 52, specifically the controller 78, transmits a signal to the blow-off mechanism 56 to operate the blow-off mechanism 56 of the knotters 34. (Advantageously the blow-off system 56 does not need to be constantly operable.) When the signal of the tripping is used to also operate the blow-off mechanism 56, it will be able to blow air on the knotters 34 when the needles 36 are coming up (operated by the tripping mechanism 52) and will clean the needles 36 when it is actually needed (which is just before the needles 36 reach the knotters 34).

Stated in another way, the desirable positioning of the sensor 76 allows the sensor 76 to detect three different things and allows the controller 78 to control various aspects of the monitoring system 58 accordingly. The sensor 76 looks for the trip lever 66 movement in the knotter cycle. If the trip lever 66 is activated it would pass the sensor 76 for about one second. The sensor 76 generates a signal that can be used by the controller 78 to set/reset the knotter cycle. So the software executed by the controller 78 knows it is a knotter cycle (and displays this on the monitor 80). If someone activates the knotter lock 54, a portion 74 comes in front of the sensor 76. The sensor 76 generates a signal that lasts longer than the one second. The software executed by the controller 78 knows now it is the knotter lock 54, which is activated, and provides a warning signal to the display monitor 80. If the operator forgets to reset the knotter lock 54, he would see the warning on the monitor 80. He will know that he should reset or disengage the knotter lock safety 54 first before he drives on to create an extremely long bale, which will have to be re-baled. The first signal (the short one, activated by the trip lever 66) generated by the sensor 76 can also be used by the controller 78 to activate the blow-off mechanism 56. This ensures that the knotters 34 will be cleaned just before a knot is made.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
   a main bale chamber configured for compressing crop material into bales, the main bale chamber comprising an outlet for discharging the compressed crop material as bales;
   needles coupled to the main bale chamber, the needles configured for threading twine through the main bale chamber around a formed bale;
   knotters configured for receiving the twine from the needles and for tying the received twine;
   a triggering system configured for triggering actions of the needles and the knotters;

a knotter lock configured for manually locking the triggering system thereby preventing the needles and the knotters from being triggered;
a blow-off mechanism configured for directing a flow of air at the knotters or an end of the needles; and
a monitoring system having a single sensor that provides signals indicating at least:
  a normal operation of the knotters;
  an engagement of the knotter lock; and
  a time to trigger the blow-off mechanism to direct a flow of air at the knotters or at the end of the needles for a predetermined amount of time.

2. The agricultural baler of claim 1, wherein the triggering system comprises a trip lever, wherein the single sensor is configured for detecting a movement of the trip lever, the detection of the movement of the trip lever being a triggering event for signaling the blow-off mechanism to cycle.

3. The agricultural baler of claim 2, wherein the movement of the trip lever also indicates normal operation of the knotters.

4. The agricultural baler of claim 2, further comprising a display for receiving at least one of a message that a bale has been completed and a normal operation message.

5. The agricultural baler of claim 1, wherein the monitoring system provides a signal indicating that the knotters have been initiated to function.

6. The agricultural baler of claim 1, wherein the monitoring system provides a warning signal if the knotter lock is engaged.

7. The agricultural baler of claim 6, further comprising a controller configured for receiving the signals from the single sensor, wherein the controller is further configured for determining that the knotter lock is engaged based on a continuous signal received from the single sensor.

8. The agricultural baler of claim 7, wherein the controller is further configured for sending a warning message to a display when the knotter lock is detected as being engaged by the single sensor.

9. The agricultural baler of claim 7, wherein the controller is further configured for providing a sound alarm or a light alarm vindicating that the knotter lock is engaged when the knotter lock is detected as being engaged by the single sensor.

10. A method of operating an agricultural baler comprising: a main bale chamber configured for compressing crop material into bales, the main bale chamber comprising an outlet for discharging the compressed crop material as bales; needles coupled to the main bale chamber, the needles configured for threading twine through the main bale chamber around a formed bale; knotters configured for receiving the twine from the needles and for tying the received twine; a triggering system configured for triggering actions of the needles and the knotters; a knotter lock configured for manually locking the triggering system thereby preventing the needles and the knotters from being triggered; a blow-off mechanism configured for directing a flow of air at the knotters or an end of the needles; and a monitoring system having a single sensor that provides signals indicating at least: a normal operation of the knotters; an engagement of the knotter lock; and a time to trigger the blow-off mechanism to direct a flow of air at the knotters or at the end of the needles for a predetermined amount of time, the method comprising a step of:
  detecting whether the knotter lock is engaged in order to prevent normal operation of the triggering system or disengaged in order to allow normal operation of the triggering system.

11. The method of claim 10, further comprising steps of:
detecting a movement of an element of the triggering system; and
causing the blow-off mechanism to direct the flow of air at the knotters or the needles dependent upon the detected movement.

12. The method of claim 10, further comprising steps of:
sending a knotter locked operation message to a display; and
producing a sound alarm or a light alarm
upon detection of the knotter lock being engaged.

* * * * *